(12) United States Patent
Grayson et al.

(10) Patent No.: US 11,546,339 B2
(45) Date of Patent: Jan. 3, 2023

(54) AUTHENTICATING CLIENT DEVICES TO AN ENTERPRISE NETWORK

(71) Applicant: Cisco Technology, Inc., San Jose, CA (US)

(72) Inventors: Mark Grayson, Berkshire (GB); Rajesh S. Pazhyannur, Fremont, CA (US); Sudhir Kumar Jain, Fremont, CA (US); Anand Oswal, Pleasanton, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 355 days.

(21) Appl. No.: 16/259,914

(22) Filed: Jan. 28, 2019

(65) Prior Publication Data

US 2020/0244668 A1 Jul. 30, 2020

(51) Int. Cl.
*H04L 9/40* (2022.01)
*H04W 12/08* (2021.01)
*H04W 12/06* (2021.01)
*H04L 67/01* (2022.01)

(52) U.S. Cl.
CPC ........ *H04L 63/104* (2013.01); *H04L 63/0853* (2013.01); *H04L 63/0876* (2013.01); *H04W 12/06* (2013.01); *H04W 12/08* (2013.01); *H04L 67/01* (2022.05)

(58) Field of Classification Search
CPC combination set(s) only.
See application file for complete search history.

(56) References Cited

U.S. PATENT DOCUMENTS

| | | | | |
|---|---|---|---|---|
| 8,170,528 | B2* | 5/2012 | Montz | H04M 3/382 455/410 |
| 8,310,946 | B2* | 11/2012 | Somasundaram | H04J 11/0093 455/446 |
| 9,615,310 | B2* | 4/2017 | Maeda | H04W 60/00 |
| 2009/0094680 | A1* | 4/2009 | Gupta | H04W 12/062 726/3 |
| 2009/0239533 | A1* | 9/2009 | Somasundaram | H04W 48/16 455/434 |
| 2011/0105080 | A1* | 5/2011 | Haughn | H04L 63/18 455/435.2 |
| 2012/0108204 | A1* | 5/2012 | Schell | H04W 8/205 455/411 |

(Continued)

OTHER PUBLICATIONS

3GPP Organizational Partners, "3rd Generation Partnership Project; Technical Specification Group Radio Access Network; Mobility procedures for Home Node B (HNB); Overall description; Stage 2 (Release 15)", 3GPP TS 25.367 V15.0.0, Jun. 2018, 14 pages.

(Continued)

*Primary Examiner* — Khoi V Le

(57) ABSTRACT

Various implementations disclosed herein provide a method for authenticating users to an enterprise network using closed subscriber groups. The method includes determining whether the client device is associated with a subscriber group that corresponds to the enterprise network. The method further includes granting the client device access to the enterprise network in response to determining that the client device is associated with the subscriber group that corresponds to the enterprise network.

22 Claims, 4 Drawing Sheets

(56) References Cited

U.S. PATENT DOCUMENTS

| | | | | |
|---|---|---|---|---|
| 2012/0108205 A1* | 5/2012 | Schell | ............... | H04W 12/086 455/411 |
| 2015/0326568 A1* | 11/2015 | Hauck | ................ | H04W 12/06 713/168 |
| 2016/0205557 A1* | 7/2016 | Tuupola | ............... | H04W 48/18 455/411 |
| 2017/0041733 A1* | 2/2017 | Babbage | ............... | H04W 4/50 |

OTHER PUBLICATIONS

Cisco, "MME Administration Guide, StarOS Release 20", Chapter: Closed Subscriber Groups, https://www.cisco.com/c/en/us/td/docs/wireless/asr_5000/20/MME/b_20_MME_Admin/b_20_MME_Admin_chapter_01010.html, Aug. 8, 2016, 8 pages.

H. Haverinen, Ed. et al., "Extensible Authentication Protocol Method for Global System for Mobile Communications (GSM) Subscriber Identity Modules (EAP-SIM)", Network Working Group, Request for Comments: 4186, Category: Informational, Jan. 2006, 92 pages.

J. Arkko et al., "Extensible Authentication Protocol Method for 3rd Generation Authentication and Key Agreement (EAP-AKA)", Network Working Group, Request for Comments: 4187, Category: Informational, Jan. 2006, 79 pages.

* cited by examiner

AUTHENTICATING CLIENT DEVICES TO AN ENTERPRISE NETWORK

TECHNICAL FIELD

The present disclosure generally relates to network access control, and in particular, to authenticating client devices to an enterprise network.

BACKGROUND

Wireless communication systems are widely deployed to provide various types of communication (e.g., voice, data, multimedia services, etc.) to multiple users. On one hand, as the demand for high-rate and multimedia data services rapidly grows, there lies a challenge to implement efficient and robust communication systems with enhanced performance. On the other hand, enterprises need to facilitate the on-boarding of the users onto their wireless networks in a controlled manner. One common method is to ask the users to enter their credentials each time the users want to access the enterprise network. This redundant method, however, is burdensome and sometimes frustrating to users.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
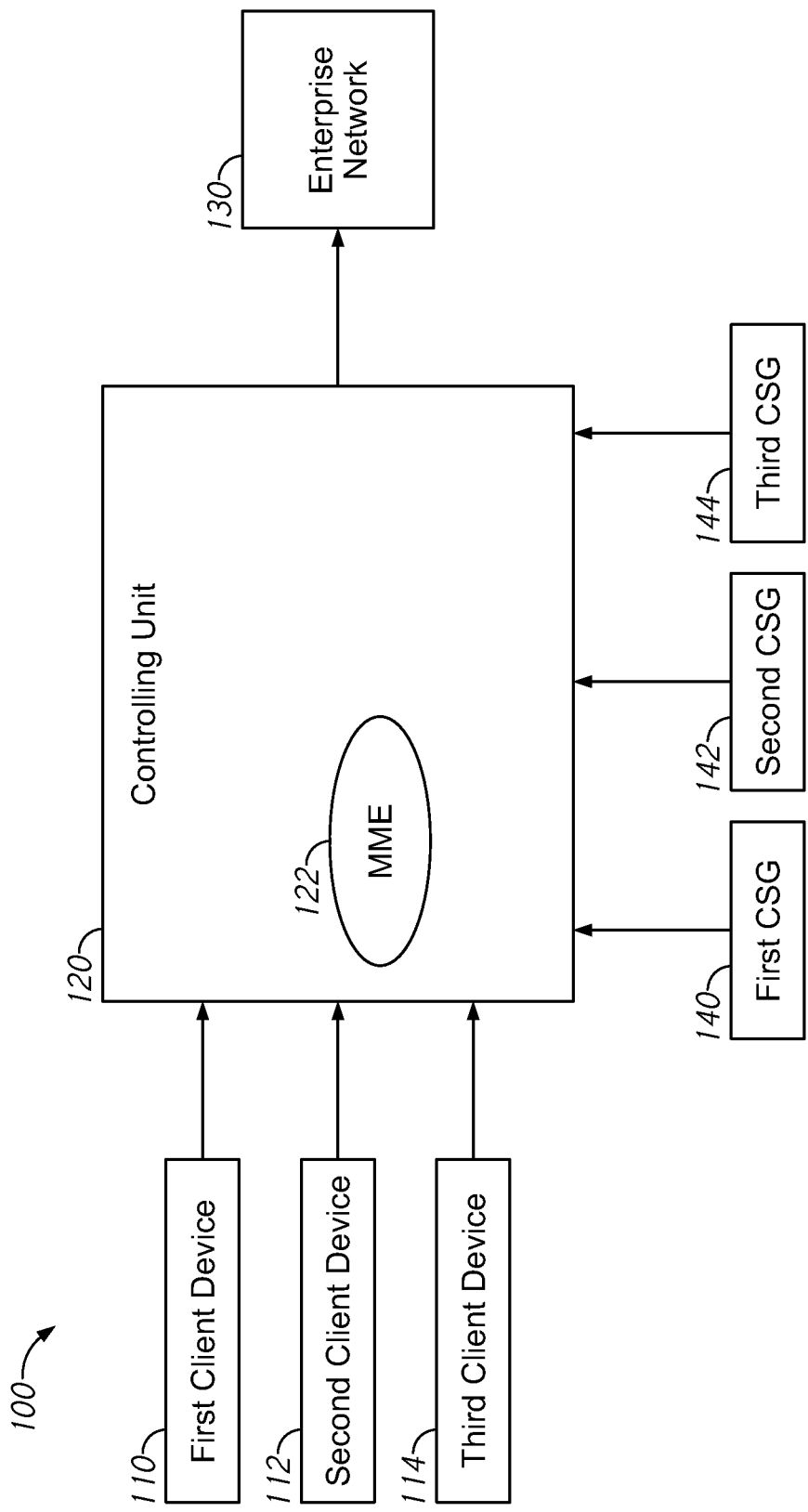
FIG. 1 is a block diagram of a network system configured for authenticating users to an enterprise network using closed subscriber groups in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE IMPLEMENTATIONS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Various implementations disclosed herein enable a network to obtain a request to access an enterprise network from one or more client devices. Disclosed method for authenticating users to an enterprise network using closed subscriber groups further includes determining whether the client device is associated with a subscriber group that corresponds to the enterprise network. The authentication method is based on a closed subscriber group concept. The method for authenticating users to an enterprise network using closed subscriber groups further includes granting the client device access to the enterprise network, upon verifying that the client device is associated with the subscriber group that corresponds to the enterprise network and is authorized to access the enterprise network.

In some implementations, the authentication procedure is expedited by causing the client device to, automatically and without user's input, send the credentials to a controlling unit of the enterprise. To that end, in some implementations, existing identity credentials are utilized to onboard service provider devices. In some implementations, a closed subscriber group (CSG) is utilized to perform the authorization procedure and provide a client device access to an enterprise network. In some implementations, utilizing a CSG reduces the need for a user to manually provide credentials and/or enterprise identifiers via a client device thereby improving battery life of the client device and enhancing user experience. In some implementations, a CSG is used for authentication and access control to be performed in an enterprise Wi-Fi environment using SIM card credentials. In various implementations, the present disclosure provides a system for handling CSG in order to support enterprise networks, e.g., enterprise Wi-Fi networks.

EXAMPLE IMPLEMENTATIONS

FIG. 1 is a block diagram of a network system 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the network system 100 may include one or more client devices 110, 112 and 114, a controlling unit 120, a Wireless Local Area Network (WLAN) controller 122 associated with the controlling unit 120, an enterprise network 130, and one or more CSGs 140, 142 and 144. In some implementations, the controlling unit 120 and the WLAN controller 122 associated with the controlling unit 120 communicate with the enterprise network 130. In some implementations, an Access Point (AP) is used instead of a WLAN controller 122.

In various implementations, the one or more client devices 110, 112 and 114 include mobile devices, such as smartphones, personal digital assistants (PDA), pocket PCs, tablet computers, smartwatches, etc. In some implementations, the one or more client devices 110, 112 and 114 include laptops, notebooks, e-readers, etc. In various implementations, the one or more client devices are devices that are capable of connecting to the network operators.

In various implementations, the controlling unit 120 includes one or more processors and a non-transitory memory. In various implementations, the controlling unit 120 is associated with the enterprise network 130 of an enterprise. In various implementations, the enterprise is a company, a business, an organization, or another purposeful endeavor. In some implementations, the enterprise is a government agency. In some implementations, the enterprise is a commercial enterprise. In some implementations, the enterprise is a scientific enterprise. In various implementations, the enterprise runs its internal network, e.g., the enterprise network 130. In various implementations, the enterprise network 130 includes an internal email system, internal software, internal webpages, etc. In some implementations, access to an enterprise network is restricted to authorized users. For example, most enterprises limit access to their internal email systems to enterprise personnel. In such examples, when an unauthorized user attempts to access the enterprise facility, the controlling unit 120 denies the user's access to the enterprise network 130. In various implementations, the controlling unit 120 uses closed subscriber groups for authorizing users to access the enterprise network 130.

In various implementations, the controlling unit 120, in response to receiving a request from a client device, obtains one or more CSGs 140, 142 and 144. In various implementations, each of the CSGs 140, 142 and 144 identifies authorized client devices. For example, in some implementations, each of the CSGs 140, 142 and 144 includes a list (e.g., a whitelist) of authorized client devices. In various implementations, a CSG indicates a set of users (e.g., client devices, subscribers) which are allowed to access a specific network (e.g., the enterprise network 130). In some implementations, a CSG identifies a group of client devices that are permitted to access an enterprise network which a particular client device has requested to join.

In various implementations, networks that work without CSG identifications allow client device to access the network if the client devices have proper Public Land Mobile Network (PLMN) information. In various implementations, networks that work with CSG identifications allow only client devices belonging to a specific authorized CSG.

In various implementations, the controlling unit 120, in response to obtaining one or more CSGs 140, 142, 144, configures the enterprise network with information related to the obtained CSGs. In one implementation, the controlling unit 120 configures the Service Set Identifiers (SSIDs) of the enterprise network WLAN according to the obtained CSG information. In one implementation, the controlling unit 120 configures an Access Network Query Protocol (ANQP) related information elements according to the obtained CGS information. The ANQP is a query and response protocol that defines services offered by an AP, e.g., a Wi-Fi hot-spot.

In various implementations, the controlling unit 120 is associated with a WLAN controller 122. In various implementations, the WLAN controller 122 provides access control and mobility management for client devices that are permitted to access one or more CSGs of a PLMN (not shown). In some implementations, a CSG ID is assigned to each authorized client device.

In some implementations, the controlling unit 120, in response to receiving the request to access the enterprise network, inserts one or more provisioned subscriber group IDs in the enterprise network. In some implementations, a server associated with each of the one or more service providers determines whether the client device is associated with a subscriber group that corresponds to the enterprise network.

Enterprises need to provide users access to their internal wireless networks in a controlled manner. One way to provide access to internal wireless networks is to utilize existing identity credentials to onboard service provider devices. In some implementations, ubiquitous SIM enables seamless access to service provider networks. In some implementations, an Extensible Authentication Protocol (EAP) enables the use of SIM card credentials to authenticate users onto an internal enterprise network, e.g., a Wi-Fi network. In some implementations, a CSG is defined to control the authentication of SIM-based subscribers onto the enterprise deployments. In some implementations, a Universal mobile telecommunications system subscriber SIM (USIM) is used.

In some implementations, CSG handling is used to be able to support enterprise Wi-Fi (e.g., control access to the enterprise Wi-Fi). In some implementations, the authenticated client devices are authorized to access particular infrastructures. When users are required to enter their credentials to authenticate onto an enterprise infrastructure, e.g., a Wi-Fi network, each SIM EAP is defined for a network operator.

In some implementations, the one or more client devices 110, 112, 114 are operable to recover their provisioned CSG information from a CSG list server. The one or more client devices 11, 112, 114 then use the recovered information to optimize their identification of enterprise networks. In some implementations, the one or more client devices 110, 112, 114 optimize their identifications of enterprise network by searching for particular SSIDs. In some implementations, the one or more client devices 110, 112, 114 optimize their identifications of enterprise network by matching the provisioned CSG information with ANQP information retrieved from the various enterprise networks.

In some implementations, the one or more client devices 110, 112, 114 are operable to embed recovered CSG information in information exchanged as part of an EAP dialogue. In some implementations, the one or more client devices 110, 112, 114 include the CSG information in the EAP-Identity signaled to the enterprise network.

In some implementations, the controlling unit 120 determines whether the client device is associated with an authorized CSG. In some implementations, the controlling unit 120 transmits the client device's CSG ID to the operator of the client device to determine whether the client device is associated with an authorized CSG. In some implementations, the controlling unit 120 receives an indication from the operator indicating whether the client device is associated with an authorized CSG.

In some implementations, the controlling unit 120 accesses a list of authorized client devices. In some implementations, the list of authorized client devices is on an internal server associated with the enterprise. In some implementations, the list of authorized client devices includes authorized client device identifiers, e.g., an identifier that identifies the client device. In some implementations, the controlling unit 120 determines whether the client device identifier is included on the list of authorized user identifiers.

In some implementations, the controlling unit 120 appends the CSGs to messages used to authorize client devices against a Home Subscriber Server (HSS). In some implementations, an EAP server performs the check against the CSG-IDs. In some implementations, the HSS is a database that contains client device-related information. In some implementations, the HSS provides support functions in mobility management, call and session setup, user authentication and/or access authorization. In some implementations, the HSS is hosted by an external server. In some implementations, the external server is hosted on a service provider associated with the client device.

In some implementations, the controlling unit 120 accesses an authentication service on each of the external servers hosted by different service providers. In some implementations, the authentication services are integrated with the service providers CGS capability.

In some implementations, if controlling unit 120 determines that the client device is associated with an authorized CSG, the controlling unit 120 authorizes the client device to access the enterprise internal network. In some implementations, the controlling unit 120 accesses a credential that the client device uses to access a mobile network that provides services to the client device. In some implementations, the controlling unit 120, upon determining that the credential is associated with an authorized client device, authorizes the client device based on the credential that the client device uses to access the mobile network. In some implementations, the controlling unit 120 accesses a phone number associated with the client device. In some implementations, the controlling unit 120, upon determining that the phone number is associated with an authorized client device, authorizes the client device to access the enterprise network based on the phone number associated with the client device. In some implementations, the controlling unit 120 determines that an identifier is associated with a SIM. In some implementations, the identifier is associated with the SIM in the EAP identity. In some implementations, the identifier is associated with the SIM returned by the service provider in an Authentication, Authorizing and Accounting (AAA) exchange. In some implementations, the controlling unit 120, upon determining that the SIM is associated with an authorized client device to access the enterprise network, authorizes the client device based on the SIM associated with the client device.

In some implementations, the controlling unit 120 is provisioned with one or more CSG IDs. In some implementations, the controlling unit 120 inserts the provisioned CSG IDs when the controlling unit 120 forwards an access request from the enterprise to a AAA server. In some implementations, the AAA server validates whether the client device belongs to the CSG ID sent along with the access request.

In some implementations, the client device determines whether the client device is a member of an authorized subscriber group associated with the network. In some implementations, the client device recovers network transmitting information. In some implementations, the client device checks whether the network transmitting information matches a provisioned information in the mobile device. In some implantations, the network transmitting information is recovered from broadcast SSIDs. In some implementations, the network transmitting information is recovered using a Generic Advertisement Service (GAS).

In some implementations, the client device accesses the enterprise network via a SIM-Universal Integrated Circuit Card (SIM-UICC)-based authentication method. The UICC is a smart card used in mobile terminals in mobile networks. In some implementations, the UICC includes a SIM application. In some implementations, the UICC includes more than one application. In some implementations, the smart card grants access to a Global System for Mobile Communications (GSM) network. In some implementations, the smart card grants access to a Universal Mobile Telecommunication System (UMTS) network. In some implementations, the smart card provides storage of the phone book of the client device.

In some implementations, the controlling unit 120 uses an EAP-SIM mechanism to grant access to the client device. EAP-SIM is an EAP mechanism for authentication and session key distribution using the GSM SIM. EAP is an authentication framework for providing the transport and usage of keying material and parameters generated by EAP methods. A protocol that uses EAP defines a way to encapsulate EAP messages within that protocol's messages. An EAP is an extension of a Point-to-Point Protocol (PPP) to enable the development of various network access authentication methods. In PPP, the authentication mechanism is chosen during the link establishment phase. While in EAP, the clients negotiate the EAP method during the connection authentication phase. The clients negotiate the specific EAP authentication scheme based on the client and server supported algorithms and ciphers when the authentication phase is reached. After the EAP method is decided mutually, EAP allows for an open-ended exchange of messages between the authenticating parties. The messages can vary based on the requirements of the network and the connection. The messages are a sequence of request and responses exchanging keying information and certificates. The EAP method determines the length and details of each authentication conversation.

In some implementations, for EAP peers and servers to support a new EAP method, the same EAP scheme library file is installed at the EAP peer and the authenticating server. This ability of EAP to allow plug-ins enables vendors to create their specific new authentication schemes. In some implementations, wireless connections operate using a wireless driver specific to the physical hardware. The EAP mechanism is coded above the driver in user space. In some implementations, EAP clients and authentication servers send messages using a supplicant. This component authenticates clients and sends EAP data link layer messages.

EAP-SIM is a wireless protocol based on GSM/GPRS authentication. EAP-SIM is used to authenticate mobile clients over a wireless network. In some implementations, EAP-SIM uses a 128-bit key. In some implementations, the authentication procedure to EAP-SIM consist of a mobile client, a AAA server, a wireless router and the GSM network. In some implementations, the client device first generates two keys from the master key. One of the two keys is used as the session key and second is used to generate the Message Authentication Code (MAC) over the RAND parameters of the GSM triplets. In some implementations, the EAP-SIM is employed for authentication and session key distribution exploiting the credentials stored in the SIM. In some implementations, the GSM networks use the keys stored in the SIM card to authenticate the client devices. Three Kc keys of the GSM authentication triplets generate a master key in EAP-SIM. In some implementations, the EAP-SIM uses a SIM authentication formula between the client and an AAA server providing indirect authentication between the client and network. In some implementations, in EAP-SIM the communication between the SIM card and the AuC reduces the need for a pre-established password between the consumer and the AAA server.

In some implementations, the authentication process is encrypted in the enterprise network. In some implementations, the data is encrypted in the enterprise network.

In some implementations, the client is not aware that a switch to an enterprise network is made as it is handled automatically based on the SIM card identification.

In some implementations, the controlling unit 120 uses an EAP-SIM-Authentication and Key Agreement (EAP-SIM-AKA) mechanism to grant access to the client device. In some implementations, the controlling unit 120 uses an EAP-SIM-Authentication and Key Agreement Prime (EAP- SIM-AKA') mechanism. In some implementations, the EAP-SIM-AKA specifies an EAP method that is based on the AKA mechanism used in UMTS and Code Division Multiple Access (CDMA) mobile networks. In some implementations, the EAP-SIM-AKA mechanism is used as a secure PPP authentication method in client devices that include an identity module. In some implementations, the EAP-SIM-AKA mechanism is used as a mobile network authentication infrastructure in the context of wireless LANs. In some implementations, the EAP-SIM-AKA mechanism is used with any other technology that can use EAP.

In some implementations, a variant of the EAP-SIM-AKA, e.g., an EAP-SIM-AKA', is used. In some implementations, the EAP-SIM-AKA' is used for non-3GPP access to a 3GPP core network. For example, the EAP-SIM-AKA' mechanism is used for non-3GPP access to an Evolution Data Optimized (EVDO) network or WiMAX network. In some implementations, the EAP-SIM-AKA' mechanism is used for non-3GPP access to an enterprise Wi-Fi network.

In some implementations, EAP-SIM is based on the authentication and encryption algorithms stored on the GSM SIM. In some implementations, EAP-SIM is based on a challenge-response mechanism. In some implementations, the EAP-SIM mechanism employs a shared secret key, e.g., Ki. In some implementations, the shared key is stored on the SIM. In some implementations, the shared key is only known to the mobile network operator's Authentication Center (AuC).

In some implementations, when a GSM SIM is given a 128-bit random number (RAND) as a challenge, the SIM calculates a 32-bit response (e.g., an SRES) and a 64-bit encryption key (Kc). In some implementations, EAP-SIM enhances the basic GSM authentication mechanism by providing for mutual authentication between the client device and an AAA server. In some implementations, the AAA server is a server program that handles user requests for access to computer resources. In some implementations, the AAA server provides authentication, authorization, and accounting services. In some implementations, the AAA server interacts with network access and gateway servers and with databases and directories containing client device information. In some implementations, the EAP-SIM mechanism secures keyed hashing algorithm, e.g., one-way hashing.

In some implementations, the enterprise network includes internal webpages associated with the enterprise. In some implementations, the enterprise network includes an email service associated with the enterprise. In some implementations, the enterprise network includes software associated with the enterprise.

Figure 2:
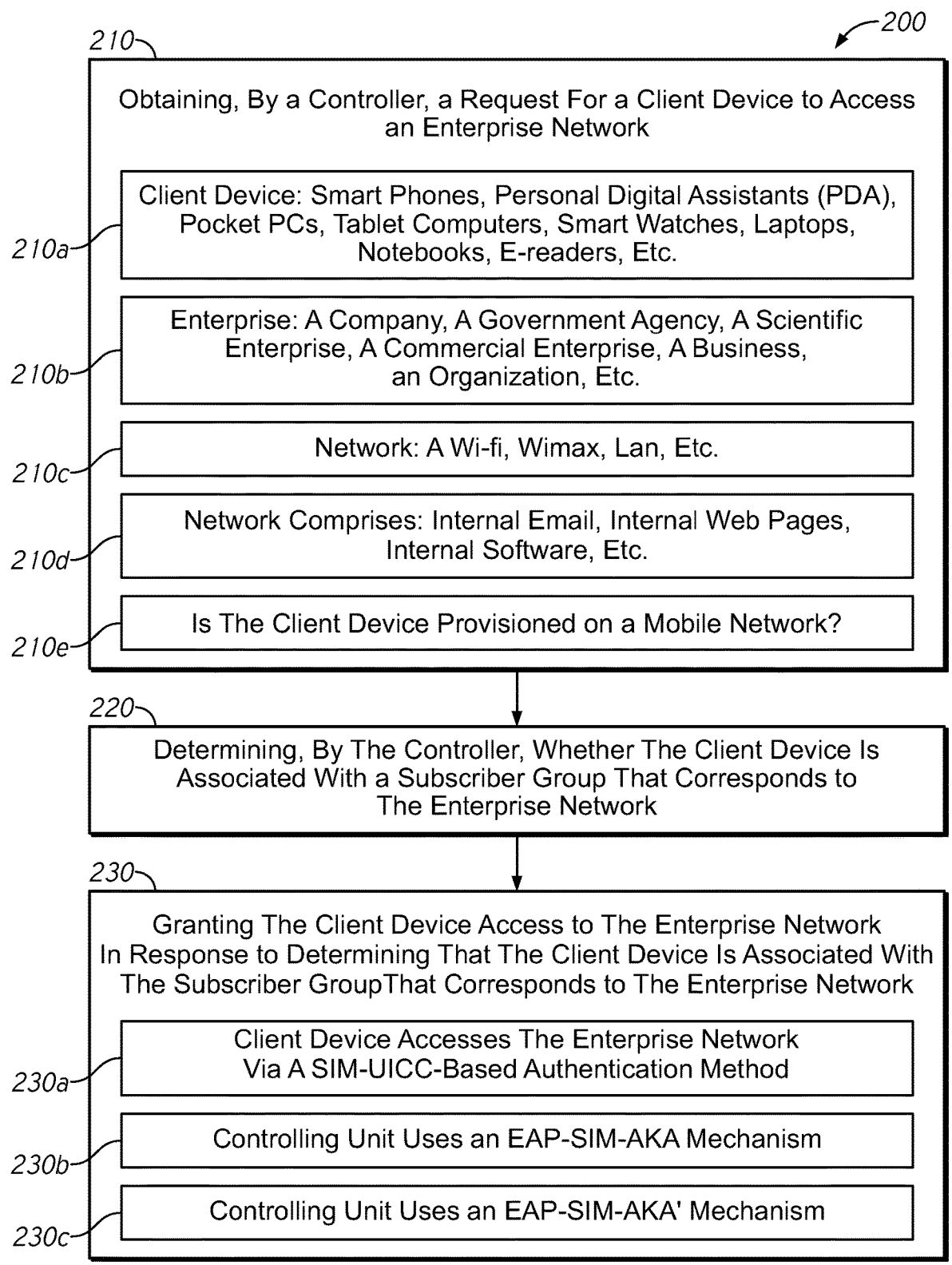
FIG. 2 is a flowchart representation of a method for authenticating users to an enterprise network using closed subscriber groups according to various implementations.

FIG. 2 is a flowchart representation of a method 200 for authenticating users to an enterprise network using closed subscriber groups. As shown at block 210, the method 200 includes obtaining, by a controlling unit, a request for a client device to access an enterprise network. As shown at block 210a, in various implementations, the client devices include mobile devices, such as smartphones, personal digital assistants (PDA), pocket PCs, tablet computers, smartwatches, etc. In some implementations, the client devices include laptops, notebooks, e-readers, etc. In various implementations, the client devices are devices that are capable of connecting to the network operators. In various implementations, the enterprise is a company, a business, an organization, or another purposeful endeavor. In some implementations, the enterprise is a government agency, a commercial enterprise or a scientific enterprise. In various implementations, the enterprise runs its internal network, e.g., the enterprise network, as shown at block 210b. In some implementations, the enterprise network is a secure Wi-Fi network. In some implementations, the enterprise network is a WiMAX or a Local Access Network (LAN), as shown at block 210c.

In various implementations, the enterprise network includes an internal email system, internal software, internal webpages, etc. In some implementations, access to an enterprise network is restricted only to authorized users, as shown at block 210d. In such cases, as shown at block 210e, the method 200 further determines if the client device is provisioned on a mobile network. As shown at block 210e, the method 200 determines if the client device is provisioned on a mobile network by obtaining one or more CSGs. In various implementations, each CSG includes a list (e.g., a whitelist) to identify the authorized client devices. In various implementations, a CSG is a set of users (e.g., client devices, subscribers) which are allowed to access a specific network. In some implementations, the CSG identifies a group of client devices that are permitted to access an enterprise network which the device has requested to join.

At block 220, the method 200 includes determining, by the controlling unit, whether the client device is associated with a subscriber group that corresponds to the enterprise network. As shown at block 230, the method 200 further includes granting the client device access to the enterprise network in response to determining that the client device is associated with the subscriber group that corresponds to the enterprise network.

In various implementations, the client device accesses the enterprise network via a SIM-UICC-based authentication method (as shown at block 230a). In some implementations, an EAP (e.g., an authentication framework frequently used in wireless networks and point-to-point connections) is used. The EAP enables the use of SIM card credentials to authenticate users onto an internal enterprise network, e.g., a Wi-Fi network.

In some implementations, the client device determines whether the client device is a member of an authorized subscriber group associated with the network. In some implementations, the client device recovers network transmitting information. In some implementations, the client device checks whether the network transmitting information matches a provisioned information in the mobile device. In some implantations, the network transmitting information is recovered from broadcast SSIDs. In some implementations, the network transmitting information is recovered using a Generic Advertisement Service (GAS).

In some implementations, CSG handling is used to be able to support enterprise Wi-Fi use cases. In some implementations, the method 200 authorizes client devices to access infrastructure associated with an enterprise. As an example, in cases where users, upon entering an enterprise premises, are required to enter their credentials to authenticate onto the enterprise infrastructure, e.g., a Wi-Fi network, each EAP-SIM is defined for an operator.

In some implementations, the method 200 uses a SIM-Universal Integrated Circuit Card (SIM-UICC)-based authentication method to authenticate client users to access the enterprise network. In some implementations, the UICC includes more than one application. In some implementations, the smart card grants access to a GSM network. In some implementations, the smart card grants access to a UMTS network.

In some implementations, the method 200 includes using an EAP-SIM mechanism to grant access to the client device.

EAP-SIM is an EAP mechanism for authentication and session key distribution using the GSM SIM. An EAP is an authentication framework for providing the transport and usage of keying material and parameters generated by EAP methods. A protocol that uses EAP defines a way to encapsulate EAP messages within that protocol's messages.

In some implementations, the method 200 includes using an EAP-SIM-AKA mechanism to grant access to the client device, as shown at block 230b. In some implementations, the method 200 includes using an EAP-SIM-AKA' mechanism, as shown at block 230c. In some implementations, the EAP-SIM-AKA specifies an EAP method that is based on the AKA mechanism used in UMTS and CDMA networks. In some implementations, the EAP-SIM-AKA mechanism is used as a secure PPP authentication method in client devices that include an identity module. In some implementations, the EAP-SIM-AKA mechanism is used as a mobile network authentication infrastructure in the context of wireless LANs. In some implementations, the EAP-SIM-AKA mechanism is used with any other technology that can use EAP.

In some implementations, a variant of the EAP-SIM-AKA (e.g., an EAP-SIM-AKA') is used. The EAP-SIM-AKA' is used for non-3GPP access to a 3GPP core network. For example, the EAP-SIM-AKA' mechanism is used for non-3GPP access to an EVDO network or a WiMAX network. In some implementations, the EAP-SIM-AKA' mechanism is used for non-3GPP access to an enterprise Wi-Fi network.

In some implementations, EAP-SIM is based on the authentication and encryption algorithms stored on the GSM SIM. In some implementations, EAP-SIM is based on a challenge-response mechanism. In some implementations, the EAP-SIM mechanism employs a shared secret key, e.g., Ki. In some implementations, the shared key is stored on the SIM. In some implementations, the shared ley is only known to the mobile network operator's AuC.

Figure 3:
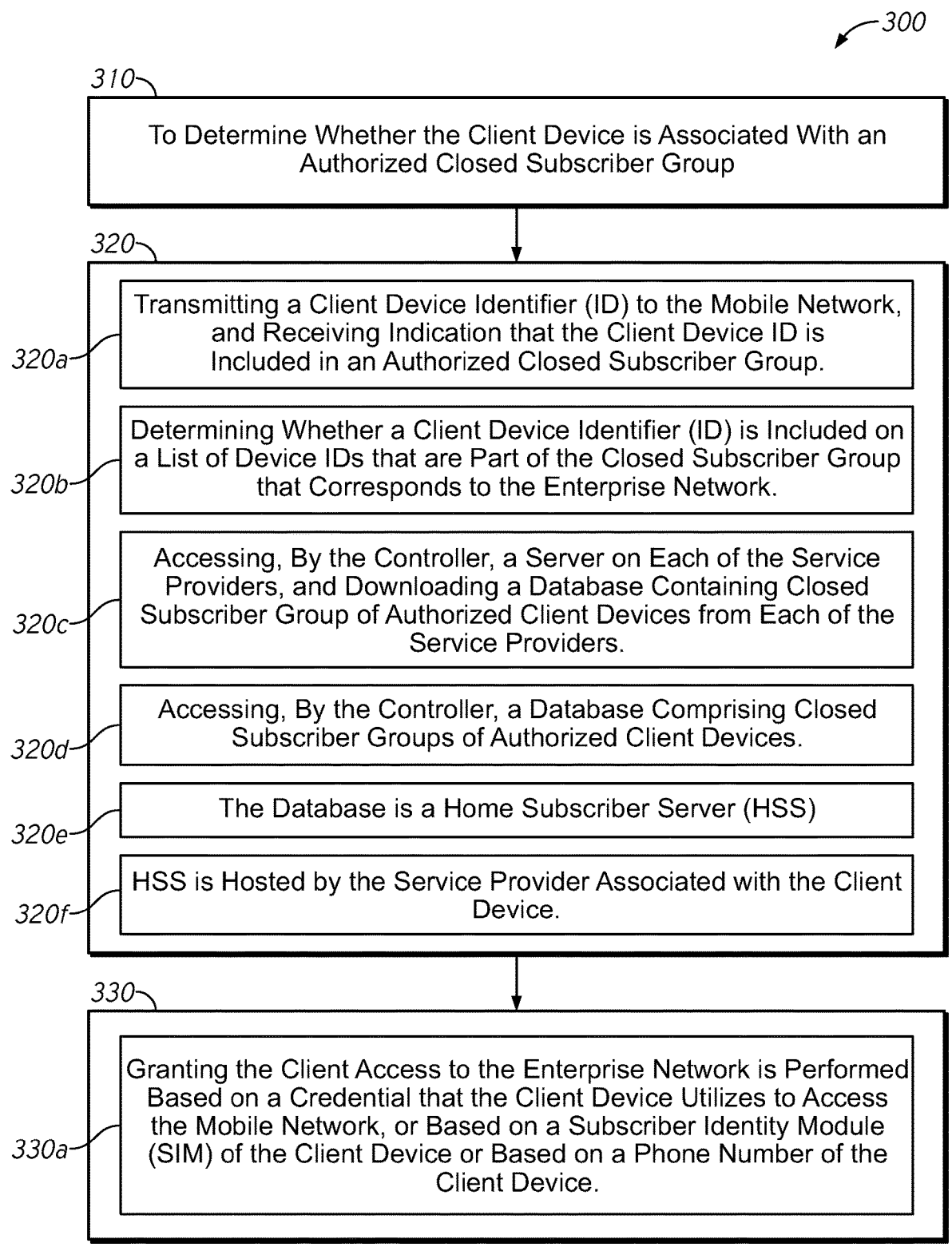
FIG. 3 is a flowchart representation of a method for determining whether the client device is associated with an authorized closed subscriber group according to some implementations.

FIG. 3 is a flowchart representation of a method 300 for controlling access to an enterprise network in accordance with some implementations. In some implementations, the method 300 includes determining whether the client device is associated with an authorized closed subscriber group according to some implementations, as shown at block 310. In some implementations, the method 300 includes transmitting a client device identifier (ID) to the mobile network and receiving an indication that the client device ID is included in an authorized closed subscriber group, as shown at block 320a. In some implementations, as shown at block 320b, the method 300 includes determining whether a client device identifier (ID) is included on a list of client device IDs that are part of the closed subscriber group that corresponds to the enterprise network. In some implementations, the method 300 includes accessing, by the controlling unit, a server on each of the service providers (as shown at block 320c). In some implementations, the method 300 further includes downloading one or more subscriber groups lists containing closed subscriber groups of authorized client devices from each of the service providers.

As shown at block 320d, in some implementations, the method 300 includes after accessing, by the controlling unit, one or more subscriber groups lists of authorized client devices, recovering network transmitting information and checking whether the network transmitting information matches a provisioned information in the client device In some implementations, the network transmitting information is covered by broadcast SSID or by using a GAS (as shown at block 320e).

As shown at block 330, in some implementations, granting the client device access to the enterprise network is performed based on a credential that the client device utilizes to access the mobile network. In some implementations, granting the client device access to the enterprise network is performed based on a SIM of the client device. In some implementations, granting the client device access to the enterprise network is performed based on a phone number of the client device.

In some implementations, the HSS provides support functions in mobility management, call and session setup, user authentication and access authorization. In some implementations, the HSS is hosted by an external server. In some implementations, the external server is hosted on a service provider associated with the client device.

In some implementations, the method 300 includes accessing more than one external servers. The external servers may be hosted by different service providers. In some implementations, the method 300 includes accessing a database on each of the external servers hosted by different service providers. In some implementations, each external server, in response to a request, downloads the database on the respective external server. In some implementations, upon verification by the external server, the method 300 includes downloading the database on the respective external server. In some implementations, each database includes CSGs of authorized client devices.

In some implementations, if the client device is determined to be associated with an authorized CSG, the method 300 includes authorizing the client device to access the enterprise internal network. In some implementations, the method 300 includes accessing a credential that the client device uses to access a mobile network that provides services to the client device. In some implementations, the method 300 includes, upon determining that the credential is associated with an authorized client device, authorizing the client device based on the credential that the client device uses to access the mobile network. In some implementations, the method 300 includes accessing a phone number associated with the client device. In some implementations, the method 300 includes, upon determining that the phone number is associated with an authorized client device, authorizing the client device based on the phone number associated with the client device. In some implementations, the method 300 includes accessing a SIM associated with the client device. In some implementations, the method 300 includes, upon determining that the SIM is associated with an authorized client device, authorizing the client device based on the SIM associated with the client device.

In some implementations, the HSS has the corresponding CGS-IDs authorized to be accessed by the client device. In some implementations, each CSG-ID is appended to every AAA message signaled by the enterprise network access point, e.g., wireless access point. In some implementations, a Remote Authentication Dial-In User Service Vendor Specific Attributes (RADIUS VSA) is used to enable the enterprise network access point to signal the enterprise access point's configured CSG-ID to a AAA server. In some implementations, the AAA server include EAP server functionality. A RADIUS is a networking protocol that provides centralized AAA management for users who connect and use a network service. In some implementations, a RADIUS is used by Internet service providers (ISPs) and enterprises to manage access to the Internet or internal networks, wireless networks, and integrated e-mail services. In some implantations, the enterprise network incorporates modems, digital subscriber line (DSL), access points, virtual private networks (VPNs), network ports, web servers, etc. In some implementations, the entities participating in an EAP scheme use RADIUS to send messages. The EAP authenticator and the authentication server sends EAP messages using RADIUS.

In some implementations, the AAA server authenticates the client device. In some implementations, the AAA server downloads the client devices' profiles from the HSS. In some implementations, the downloaded client devices' profiles include the client devices permitted CSG-IDs. In some implementations, the AAA server determines whether the client device is authorized to access by using the CSG-ID signaled by the enterprise network. If the client device is authorized, then the client device is redirected to the enterprise network.

In some implementations, when the client device is determined as an unauthorized client device, the AAA server denies access to the client device. In some implementations, notification codes are used for authorization related information. In some implementations, the notification code is defined to indicate that the client device has been denied access to the enterprise network based on an authorization decision. In some implementations, the client device uses this denial decision to determine whether to restrict future selection of the enterprise network.

Figure 4:
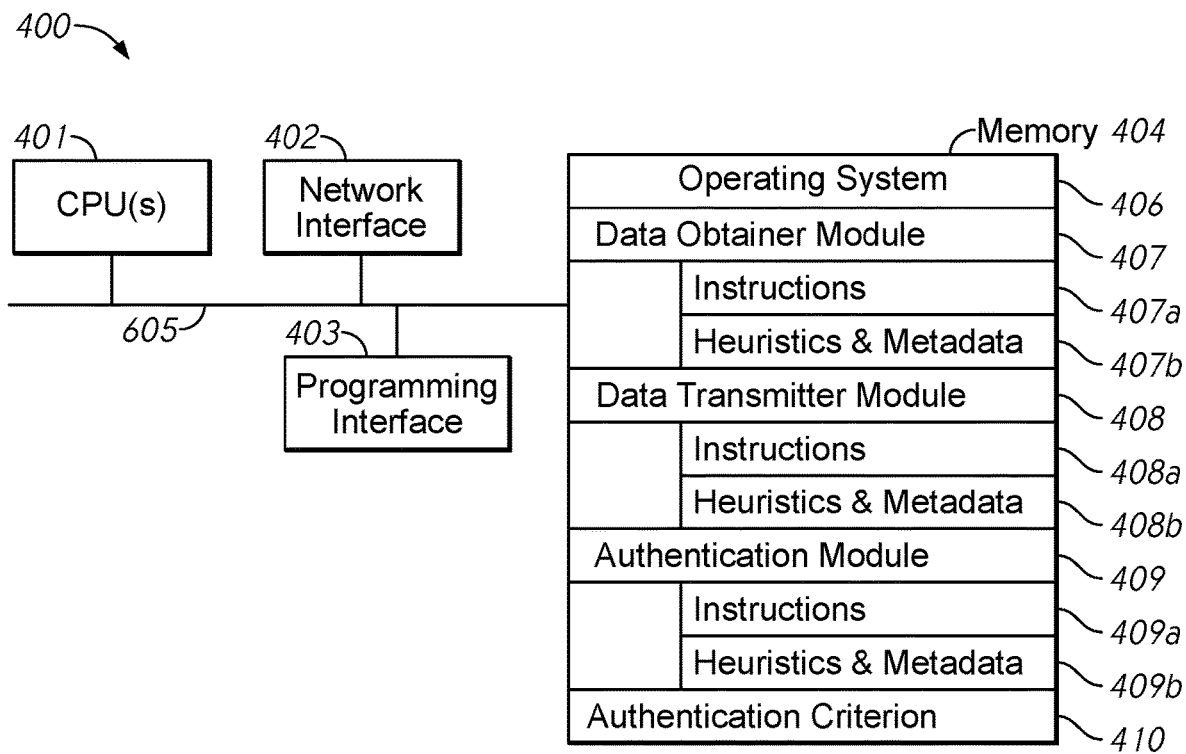
FIG. 4 is a block diagram of a server system for authenticating users to an enterprise network using closed subscriber groups in accordance with some implementations.

FIG. 4 is a block diagram of a server system 400 enabled with various modules for authenticating users to an enterprise network using closed subscriber groups in accordance with some implementations. In other words, in some implementations, the server system 400 implements a method (e.g., the method 200 and/or the method 300) to authenticate a user to an enterprise network using closed subscriber groups. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the server system 400 includes one or more processing units (CPUs) 401, a network interface 402, a programming interface 403, a memory 404, and one or more communication buses 405 for interconnecting these and various other components.

In some implementations, the network interface 402 is provided to, among other uses, establish and maintain a metadata tunnel between a cloud-hosted network management system and at least one private network including one or more compliant devices. In some implementations, the one or more communication buses 405 include circuitry that interconnects and controls communications between system components. The memory 404 includes high-speed random-access memory, such as DRAM, SRAM, DDR RAM or other random-access solid-state memory devices, and may include non-volatile memory, such as one or more magnetic disk storage devices, optical disk storage devices, flash memory devices, or other non-volatile solid-state storage devices. The memory 404 optionally includes one or more storage devices remotely located from the one or more CPUs 401. The memory 404 comprises a non-transitory computer readable storage medium.

In some implementations, the memory 404 or the non-transitory computer readable storage medium of the memory 404 stores the following programs, modules and data structures, or a subset thereof including an optional operating system 406, a data obtainer module 407, a data transmitter module 408, an authentication module 409, and authentication criterion 410. In various implementations, the authentication module 409 performs substantially the same operations as the controlling unit 120 shown in FIG. 1.

The operating system 406 includes procedures for handling various basic system services and for performing hardware dependent tasks. In various implementations, a data obtainer module 407 obtains client device data from the client devices or the external servers associated with mobile networks. To that end, in various implementations, the data obtainer module 407 includes instructions and/or logic 407a, and heuristics and metadata 407b. In various implementations, the data transmitter module 408 transmits client device data to the client devices or the external servers associated with mobile networks. To that end, in various implementations, the data transmitter module 408 includes instructions and/or logic 408a, and heuristics and metadata 408b. In various implementations, the authentication module 409 determines whether the client device data received from the client devices or the external servers associated with mobile networks satisfies the authentication criterion 410 in order to grant the client device access to the enterprise network. To that end, in various implementations, the authentication module 409 includes instructions and/or logic 409a, and heuristics and metadata 409b.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented, and/or a method may be practiced using any number of the aspects set forth herein. In addition, such an apparatus may be implemented, and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular implementations only and is not intended to be limiting of the claims. As used in the description of the implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at a controlling unit including one or more processors and a non-transitory memory:
      obtaining, by the controlling unit, a request for a client device to access an enterprise network, wherein the request indicates that the client device is provisioned on a mobile network;
      determining whether the client device is included in a closed subscriber group, wherein the closed subscriber group indicates one or more client devices that are permitted to access the enterprise network;
      based on determining that the client device is included in the closed subscriber group, using the closed subscriber group for performing an authorization procedure for a client device access to the enterprise network, wherein the enterprise network is a wireless local area network (WLAN); and
      granting the client device access to the enterprise network in response to determining that the client device is associated with the closed subscriber group that corresponds to the enterprise network,
      wherein determining whether the client device is included in the closed subscriber group that corresponds to the enterprise network comprises:
         determining whether a client device identifier (ID) that identifies the client device is included on a list of client device IDs that are part of the closed subscriber group that corresponds to the enterprise network.

2. The method of claim 1, wherein determining whether the client device is included in the closed subscriber group that corresponds to the enterprise network further comprises:
   transmitting the client device ID that identifies the client device to the mobile network; and
   receiving an indication that the client device ID is included in the closed subscriber group that corresponds to the enterprise network.

3. The method of claim 1, wherein granting the client device access to the enterprise network is performed based on a credential that the client device utilizes to access the mobile network.

4. The method of claim 1, wherein granting the client device access to the enterprise network is performed based on a phone number of the client device.

5. The method of claim 1, wherein granting the client device access to the enterprise network is performed based on a subscriber identity module (SIM) of the client device.

6. The method of claim 1, further comprising:
   determining, by the client device, whether the client device is a member of an authorized closed subscriber group associated with the enterprise network;
   recovering network transmitting information; and
   checking whether the network transmitting information matches a provisioned information in the client device.

7. The method of claim 6, wherein the network transmitting information is recovered from broadcast SSIDs or by using a Generic Advertisement Service (GAS).

8. The method of claim 1, wherein determining whether the client device is included in the closed subscriber group that corresponds to the enterprise network further comprises:
   accessing, by the controlling unit, a server on each of one or more service providers; and
   downloading, from each server, one or more closed subscriber group lists of authorized client devices from each of the one or more service providers.

9. The method of claim 1, wherein the client device accesses the enterprise network via SIM-Universal Integrated Circuit Card (SIM-UICC)-based authentication.

10. The method of claim 9, wherein the SIM-UICC-based authentication includes a SIM-Authentication and Key Agreement (SIM-AKA) or a SIM-Authentication and Key Agreement Prime (SIM-AKA').

11. The method of claim 1, wherein the enterprise network comprises internal emails software or internal webpages associated with an enterprise.

12. The method of claim 1, wherein a server associated with each of one or more service providers determines whether the client device is included in the closed subscriber group that corresponds to the enterprise network.

13. The method of claim 1, wherein determining whether the client device is included in the closed subscriber group that corresponds to the enterprise network further includes communicating an authentication request to an authentication, authorization, and accounting (AAA) server associated with the enterprise network, wherein an identifier for the closed subscriber group is included in the request to the AAA server.

14. The method of claim 1, wherein determining whether the client device is included in the closed subscriber group that corresponds to the enterprise network further includes communicating an authentication request to an authentication, authorization, and accounting (AAA) server associated with the enterprise network, wherein the AAA server obtains an identifier for the closed subscriber group via a profile for the client device obtained from a Home Subscriber Server (HSS).

15. The method of claim 1, wherein an access point of the enterprise network is enabled to include an identifier for the closed subscriber group in the request to an authentication, authorization, and accounting (AAA) server using a remote authentication dial-in user service vendor specific attributes.

16. A non-transitory computer storage that stores executable program instructions that, when executed by one or more computing devices of a controlling unit, cause the controlling unit to:
   obtain a request for a client device to access an enterprise network, wherein the request indicates that the client device is provisioned on a mobile network;
   determine whether the client device is included in a closed subscriber group, wherein the closed subscriber group indicates one or more client devices that are permitted to access the enterprise network;
   based on determining that the client device is included in the closed subscriber group, use the closed subscriber group for performing an authorization procedure for a client device access to the enterprise network, wherein the enterprise network is a wireless local area network (WLAN); and
   grant the client device access to the enterprise network in response to determining that the client device is associated with the closed subscriber group that corresponds to the enterprise network, wherein determining whether the client device is included in the closed subscriber group that corresponds to the enterprise network includes:

determining whether a client device identifier (ID) that identifies the client device is included on a list of client device IDs that are part of the closed subscriber group that corresponds to the enterprise network.

17. The non-transitory computer storage of claim 16, wherein the client device accesses the enterprise network via a SIM-Universal Integrated Circuit Card (SIM-UICC)-based authentication.

18. The non-transitory computer storage of claim 17, wherein the SIM-UICC-based authentication includes a SIM-Authentication and Key Agreement (SIM-AKA) or a SIM-Authentication and Key Agreement Prime (SIM-AKA').

19. The non-transitory computer storage of claim 16, wherein the client device accesses the enterprise network using a phone number of the client device.

20. An apparatus comprising:
a network interface configured to enable network communications with a plurality of client devices; and
a processor, wherein the processor is configured to perform operations comprising:
obtaining a request for a client device to access an enterprise network, wherein the request indicates that the client device is provisioned on a mobile network;
determining whether the client device is associated with a closed subscriber group that corresponds to the enterprise network based on determining, using the closed subscriber group for performing an authorization procedure for a client device access to the enterprise network, that the client device is authorized to access the enterprise network, wherein the enterprise network is a wireless local area network (WLAN); and
in response to determining that the client device is associated with the closed subscriber group that corresponds to the enterprise network:
granting the client device access to the enterprise network,
obtaining network transmitting information from broadcast service set identifiers (SSIDs) or by using a Generic Advertisement Service (GAS), and
determining whether the network transmitting information matches provisioning information in the client device.

21. The apparatus of claim 20, wherein the processor is configured to perform an operation of determining whether the client device is associated with the closed subscriber group that corresponds to the enterprise network by:
transmitting, using the network interface, a client device identifier (ID) that identifies the client device to the mobile network; and
receiving, using the network interface, an indication that the client device ID is included in the closed subscriber group that corresponds to the enterprise network.

22. The apparatus of claim 20, wherein the processor is configured to perform an operation of determining whether the client device is associated with the closed subscriber group that corresponds to the enterprise network by:
determining whether a client device identifier (ID) that identifies the client device is included on a list of client device IDs that are part of the closed subscriber group that corresponds to the enterprise network.

\* \* \* \* \*